United States Patent [19]

Steinberger et al.

[11] Patent Number: 4,548,999
[45] Date of Patent: Oct. 22, 1985

[54] ELASTOMERIC ORGANOPOLYSILOXANES CONTAINING POLYCARBODIIMIDE-POLYSILOXANE COPOLYMERS

[75] Inventors: Helmut Steinberger, Leverkusen; Hans-Heinrich Moretto; Werner Michel, both of Cologne; Wilfried Kniege, Bergisch-Gladbach, all of Fed. Rep. of Germany

[73] Assignee: Bayer Aktiengesellschaft, Leverkusen, Fed. Rep. of Germany

[21] Appl. No.: 231,693

[22] Filed: Feb. 5, 1981

Related U.S. Application Data

[63] Continuation-in-part of Ser. No. 85,840, Oct. 18, 1979, abandoned, and a continuation-in-part of Ser. No. 86,113, Oct. 18, 1979, abandoned.

[30] Foreign Application Priority Data

Nov. 2, 1978 [DE] Fed. Rep. of Germany ....... 2847481
Nov. 2, 1978 [DE] Fed. Rep. of Germany ....... 2847573

[51] Int. Cl.$^4$ ............................................. C08L 83/06
[52] U.S. Cl. .................................... 525/453; 524/500; 524/267; 525/477; 528/23; 528/28
[58] Field of Search .................... 528/23, 28; 525/453, 525/477

[56] References Cited

U.S. PATENT DOCUMENTS 4,076,763  2/1978  Thom et al. .......................... 528/23
4,214,066  7/1980  Moretto et al. ....................... 528/28

*Primary Examiner*—Wilbert J. Briggs, Sr.
*Attorney, Agent, or Firm*—Sprung Horn Kramer & Woods

[57] ABSTRACT

A composition which is heat curable to give an elastomer of improved properties comprising
 (a) an organopolysiloxane polymer having a viscosity of 1,000,000 to 200,000 mPas at 25° C. and comprising the structural unit $$(R)_a SiO_{\frac{4-a}{2}}$$

wherein
 R is a hydrocarbon radical or a halohydrocarbon radical, and
 a is between about 1.95 and 2.01,
 (b) a polycarbodiimide-polysiloxane copolymer comprising a polysiloxane continuous liquid phase containing a discontinuous phase of finely dispersed polycarbodiimide particles produced by condensing a diisocyanate in the polysiloxane,
 (c) a curing catalyst, and
 (d) a filler, the polycarbodiimide comprising about 0.1 to 80% by weight of (a) plus (b). Upon curing, the permanent set of the elastomer is reduced and/or the resistance to hydrolytic degradation is improved.

9 Claims, No Drawings

ELASTOMERIC ORGANOPOLYSILOXANES CONTAINING POLYCARBODIIMIDE-POLYSILOXANE COPOLYMERS

This application is a continuation-in-part of application Ser. No. 085,840 and 086,113 both filed Oct. 18, 1979 and now abandoned.

The present invention relates to compositions which can be heat-cured to give elastomers; the compositions have improved resistance to hydrolytic degradation and are based on highly viscous organopolysiloxane compositions, with the addition of polycarbodiimide-polysiloxane copolymers.

It is known that organopolysiloxane elastomers, for example polydimethylsiloxane rubbers, retain their elastomeric properties over a wide temperature range. Because of these properties, they have found numerous applications.

However, a difficulty which continues to exist in the field of siloxane elastomer technology is the degradation of the polymer structure if the elastomer is exposed to certain environmental conditions for a long time. For example, with some polysiloxane elastomers, when used as sealing materials in certain systems, hydrolytic degradation occurs to such an extent that there is considerable loss of their elastomeric properties. In the absence of atmospheric oxygen the degradation takes place so rapidly that, for example, vulcanized polydimethylsiloxane polymers heated in a sealed tube at 200° C. as a rule are completely destroyed after only 3 days.

Admittedly, it is known (compare, for example, French Patent Specification No. 1,440,466 and U.S. Pat. No. 3,031,430) that certain metals and metal compounds retard hydrolytic degradation and hence act as stabilizers; for example, bismuth and cadmium, incorporated in the form of a low-melting alloy, provide a good protective effect, but the use of these metals in siloxane elastomers suffers from disadvantages. Furthermore, stabilization against thermal ageing is possible, for example by adding iron oxide or iron hydroxide in small amounts (0.001 to 0.75 part by weight per 100 parts by weight of silicone elastomer), or by adding nickel salts, such as nickel chloride, nickel acetate or nickel octoate. However, all these known additives produce only inadequate stabilization of organopolysiloxane polymers against hydrolytic degradation. Dicyclohexylcarbodiimide, used in rubber technology to protect certain elastomers against hydrolytic degradation, disperses so poorly when incorporated into silicone rubber that it has not been possible to observe a protective effect.

Conventional organopolysiloxane elastomers, when tested according to DIN 53,517, can have a permanent set of 95% when exposed for some time to temperatures of above 150° C. However, for many applications, for example as gaskets, it is necessary that organopolysiloxane elastomers should be capable of exposure to temperatures of up to 300° C. or more for long periods without an excessive increase in the permanent set.

Hitherto, compositions, heat-curable to give elastomers, which are based on organopolysiloxane compositions with metal oxides, metal peroxides or metal carbonates as agents for reducing the permanent set have been disclosed. Inter alia, the relevant compounds of barium, cadmium, magnesium, praseodymium and strontium have been proposed for this purpose. According to U.S. Pat. No. 2,448,530, mercury, its salts or oxides are added to the silicone rubber, before vulcanization in order to reduce the permanent set. However, the high toxicity of the mercury preparations prevents a general applicability of this process. According to U.S. Pat. No. 2,713,564, alkyldithiocarbamates of sodium, zinc, lead, tellurium, selenium, copper or bismuth can take the place of the mercury compounds. Furthermore, according to U.S. Pat. No. 2,666,041 the addition of certain quinones such as, for example, naphthoquinone, alkylated quinones, halogenated quinones or hydrocarbon esters of hydroquinone have an advantageous effect in reducing the permanent set of silicone rubber.

A great advance was achieved with the introduction of silanes, containing vinyl groups, into silicone rubber technology; these compounds, in conjunction with curing agents based on alkyl peroxides or alkyl per-esters and in conjunction with the metal-catalyzed addition crosslinking of hydrogenosiloxanes to vinylsiloxanes permit the preparation of vulcanized products having low permanent set.

Nevertheless, even in the case of silicone rubber mixtures containing vinyl groups the permanent set of the products obtained by crosslinking with acyl peroxides, especially bis-(2,4-dichlorobenzoyl)peroxide, remains unsatisfactorily high. An explanation of this phenomenon cannot be provided. In spite of this disadvantage, bis(2,4-dichlorobenzoyl)peroxide cannot be replaced in every case by the systems mentioned above since, for example, alkyl peroxides show unsatisfactory crosslinking characteristics in the continuous vulcanization of endless strands, cables or hoses, if the vulcanization is carried out without application of pressure, in hot air or by means of infra-red radiation. The addition crosslinking method cannot yet be regarded as industrially fully developed.

Continuous vulcanization, without using pressure, by means of hot air or infra-red radiation was found general acceptance for the vulcanization of silicone rubber in preference to other processes such as the salt bath or steam tunnel process. In this type of vulcanization has hitherto been necessary to accept a high permanent set, resulting from the peculiarity of the bis-(2,4-dichlorobenzoyl)peroxide.

It is accordingly an object of the present invention to provide novel advantageous organopolysiloxane elastomers which are resistant to hydrolytic degradation and which exhibit the heat resistance, solvent resistance and mechanical behavior of known polysiloxane elastomers.

It is another object of the invention to provide compositions which can be cured to give elastomers exhibiting reduced permanent set.

These objects are realized in accordance with the present invention pursuant to which there is added to an organopolysiloxane polymer to be cured a polycarbodiimidepolysiloxane copolymer, the composition usually further containing a curing catalyst and/or fillers and/or conventional additives.

The compositions according to the invention, which are heat-curable to give elastomers, can for example consist of highly viscous organopolysiloxanes which are in themselves known, especially those containing about 85 to 100 mol percent of methylvinylsiloxane units and/or dimethylvinylsiloxane units, mixed with reinforcing and/or non-reinforcing fillers and in most cases also with agents for reducing the stiffening-up which occurs on storage, especially organosilanols and/or organosiloxanols, and curing agents.

Advantageously the organopolysiloxane polymer has a viscosity of 1,000,000 to 200,000,000 mPas at 25° C. and comprises the structural units

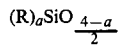

The radicals R in the organopolysiloxane polymer or the mixtures of such organopolysiloxane polymers and especially in a diorganopolysiloxane polymer having a viscosity of about 1,000,000 to 200,000,000 centipoise at 25° C. are selected for example, from amongst monovalent hydrocarbon radicals, halogen-substituted monovalent hydrocarbon radicals and cyanoalkyl radicals. Such radicals are, for example alkyl radicals, such as methyl, ethyl and propyl, cycloalkyl radicals, such as cyclohexyl and cycloheptyl, alkenyl radicals, such as vinyl and allyl, halogen-substituted alkyl radicals, such as fluoropropyl and trifluoropropyl and in particular fluorinated alkyl radicals of the formula $R^4CH_2$—, $R^4$ being a perfluoroalkyl radical, mononuclear aryl radicals, such as phenyl, alkaryl radicals, such as methylphenyl and ethylphenyl, aralkyl radicals such as phenylmethyl and phenylethyl, cyanoalkyl radicals, such as cyanopropyl and the like, as well as other substituents which are usually encountered as substituents of linear diorganopolysiloxanes. It is particularly preferred to select the radicals R from amongst alkyl radicals with 1 to 8 carbon atoms, alkenyl radicals with 2 to 8 carbon atoms, halogen-substituted alkyl radicals, such as fluoroalkyl radicals with 3 to 8 carbon atoms, and mononuclear aryl radicals.

Further additives used as a rule are pigments, antioxidants and hot air stabilizers based on known metal oxides. Examples of reinforcing fillers are, in particular, silicon dioxide produced pyrogenically in the gas phase, precipitated silicon dioxide having a surface area of at least 50 m²/g, and silicic acid hydrogels dehydrated in such a way as to retain the structure. Examples of non-reinforcing fillers are, in particular, diatomaceous earth, quartz powder and chalk. Titanium dioxides, iron oxide, $Al_2O_3$, $CaCO_3$, silicates and the like are also suitable.

Examples of curing agents are alkyl peroxides, aryl peroxides or acyl peroxides, used individually or in combination. However, the organopolysiloxane compositions can also be cured by gamma-rays.

The specific peroxide curing catalysts which are preferred include di-tertiary-butyl peroxide, tertiary-butyl triethylmethyl peroxide, tertiary-butyl triphenylmethyl peroxide, tertiary-butyl perbenzoate and di-tertiaryalkyl peroxides, such as dicumyl peroxide. Other suitable peroxide catalysts which cause curing both via saturated and via unsaturated hydrocarbon groups on the silicone chain are aryl peroxides, the benzoyl peroxides, mixed alkylaryl peroxides, such as tertiary-butyl perbenzoate, chloroaroyl peroxides, such as 1,4-dichlorobenzoyl peroxide, 2,4-dichlorobenzoyl peroxide and monochlorobenzoyl peroxide, benzoylperoxide methyl ethyl ketone peroxide and the like. In general, 0.1 to 8% by weight of the peroxide, relative to the rubber, are employed. Preferably, about 0.5 to 4% by weight are employed.

The choice of the crosslinking agent depends on the processing conditions. Thus, for example, most peroxides are employed for vulcanization under pressure at temperatures above 100° C. In industrial practice, bis-(2,4-dichlorobenzoyl)peroxide has proved a valuable peroxide which, during vulcanization without externally applied pressure, gives bubble-free and pore-free vulcanized products.

Since the peroxides used belong to different chemical categories of compounds, their decomposition products exert different effects in silicone rubber which as a rule adversely influence the pattern of properties of the silicone rubber. In particular, the acids liberated on decomposition of acyl peroxides and per-esters accelerate the depolymerization of silicone polymers. The cause for this is a shift in the pH value, which favors attack by water in every form.

According to the present invention, effective protection against the deterioration of the pattern of properties of organopolysiloxane rubber materials under hydrolytic environmental conditions is achieved by using siloxane polymers which contain polycarbodiimide groups.

This finding was surprising inasmuch as the incorporation of monomeric carbodiimides, such as, for example, dicyclohexylcarbodiimide, or of mixtures of higher-molecular carbodiimides, such as are employed in the plastics industry as agents for protecting certain polyester-based or polyether-based polymers against hydrolysis, proved ineffective in silicone rubber.

Furthermore, it was surprising that the good hot air resistance of silicone rubber is not adversely affected by the presence of the relatively large organic radicals of the polycarbodiimide constituent.

Suitable polycarbodiimide-polysiloxane copolymers are modified polysiloxanes such as are described, for example, in application Ser. No. 918,128, filed June 22, 1978, now pending, and U.S. Pat. No. 4,076,763, the disclosures of which are incorporated herein by reference. It is preferred to employ those copolymers in which the polysiloxanes and polycarbodiimide are present as distinguishable phases, optionally with partial chemical and/or physical bonding.

The improved organopolysiloxane compositions according to the present invention are, accordingly, polysiloxanes which contain polycarbodiimide-filled organopolysiloxane mixtures which in turn are composed of the following two phases: (i) a continuous phase of an organopolysiloxane liquid and (ii) a discontinuous phase of finely dispersed particles of a carbodiimide polymer which has been obtained by polycondensation of the corresponding monomer or monomer mixture in the presence of the organopolysiloxane and of a carbodiimidation catalyst.

The polycarbodiimide-filled organopolysiloxane compositions are prepared, for example, by thoroughly mixing the organopolysiloxane liquid with diisocyanates or polyisocyanates or mixtures thereof in the presence of a catalyst which accelerates the carbodiimide formation, or by mixing the organopolysiloxane liquid with polycarbodiimides prepared in situ and in themselves known. The polymer mixture contains about 3–80% by weight, preferably about 5–70% by weight, of polycarbodiimide (based on the total mixture).

Instead of starting from pure polymer it is possible to employ mixtures of customary polysiloxanes with polycarbodiimide-polysiloxane copolymers. This can be done by premixing polymers with one another and then mixing with the fillers and auxiliaries already mentioned, or by blending a premix of a customary polysiloxane polymer, fillers and auxiliaries, with the polycarbodiimide polymer, or by premixing polycarbodiimide-polysiloxane polymer with fillers and auxiliaries, or by blending premixes of both types of polymers with one another in the desired ratio.

It follows from the above that the sequence of mixing is not critical.

Equally, the mixing temperature is not subject to any special restrictions. All procedures customary with silicone rubber can also be employed in the present case.

For example, the individual components of which the rubber mixture consists can be mixed with one another at any temperature above the glass transition temperature of the polymer, for example at room temperature, and during the mixing process the temperature of the mixture may rise to 70°–100° C.; alternatively, the components can be mixed by means of heated mixing equipment at temperatures of up to 200° C. Further customary methods are those in which the mixture is first prepared at temperatures below 100° C. and is then subjected to an after-treatment at temperatures above 100° C., for example 150° C. The abovementioned mixing process can also take place under reduced pressure in order to remove undesired volatile constituents from the mixture.

The mixing can be carried out on the open two-roll equipment customary in the rubber industry, and this equipment can be cooled or heated as desired. Further, paddle kneaders of the type of the sigma-kneaders or Z-blade kneaders, without floating weights, and with or without a discharge screw, and floating-weight kneaders of the Banbury type, as well as continuous mixing equipment, for example twin-screw mixers and single-screw mixers, can be used.

The advantageous effect of the polycarbodiimide polymer on the permanent set is particularly marked in the case of those vulcanized silicone rubbers where the permanent set is high. However, even in the case of rubber mixtures which give vulcanized products of low permanent set, a further improvement as a result of the additive according to the invention can be observed.

With regard to proportions, the carbodiimide content (present in component (b)) is from about 0.1 to 80%, preferably from about 0.1 to 70% by weight based on (a) plus (b). For reduced permanent set it is preferably about 0.1 to 12% by weight, especially 0.5 to 3%. For improved hydrolytic stability the content is advantageously about 1 to 20% by weight. For example, if 10 parts by weight of a component (b) containing 2 parts by weight of polycarbodiimide and 8 parts by weight of polysiloxane are mixed with 90 parts of organopolysiloxane (a), the polycarbodiimide content would be 2% by weight of (a) plus (b).

If the polycarbodiimide content is higher than recited technical disadvantages in respect of processability manifest themselves, since, in order to achieve satisfactory vulcanication characteristics, either uneconomically large amounts of peroxide must be employed or the polymer must contain several times the usual content of vinyl groups. Furthermore, the high content of rigid molecular unit structures causes deterioration of the elastomeric properties.

The examples which follow are intended to explain the silicone elastomers according to the invention in more detail. Mixtures of the abovementioned type were produced under the usual conditions on a rubber mixing mill. The composition of the samples is given in parts by weight. The test specimens were vulcanized in a heated press.

The test specimens were examined in accordance with the following standard specifications:

Strength, elongation, 100 and 300% modulus: DIN 53,504. Hardness: DIN 53,505. Elasticity: DIN 53,512.
Tear propagation resistance (crescent): ASTM-D 624 B. Permanent set: DIN 53,517.

EXAMPLE 1

This example illustrates a method of preparation of the polycarbodiimide-polysiloxane copolymer.

For this preparation, 20 kg of a polydimethylsiloxane with terminal hydroxyl groups, having a viscosity of 10,000 mPas were stirred by means of a stirring disc at 400 to 500 rpm, and warmed to 70° C. 30 g of a 1-methylphospholine oxide isomer mixture are added and 20 kg of an isomer mixture of 80 percent of toluylene-2,4-diisocyanate and 20 percent of toluylene-2,6-diisocyanate are metered into this mixture in a uniform stream over the course of 2 hours, with constant stirring. The carbon dioxide formed is led away. After completion of the addition of the isocyanate, stirring is continued for one hour at the same temperature, after which the product is cooled to room temperature.

The product is a white to pale yellowish, viscous composition having a viscosity of about 200,000 mPas.

EXAMPLE 2

This example describes the preparation of a polycarbodiimide-polysiloxane copolymer based on diphenylmethane-4,4'-diisocyanate.

750 g of polydimethylsiloxane with terminal hydroxyl groups and having a viscosity of 18,000 mPas are heated to 80° C. and 0.6 ml of 1-methyl-phospholine oxide isomer mixture is added. 750 g of diphenylmethane-4,4'-diisocyanate are metered in over the course of 2 hours at 80° C., with constant stirring, and after completion of the addition stirring is continued for 1 hour at 80° C. A white, homogeneous and pourable product having a viscosity of 330,000 mPas is obtained.

EXAMPLES 3 TO 8

A silicone rubber premix is prepared on a rubber mixing mill by mixing, in the usual manner, 1 part of hexamethyldisilazane, 58 parts of a pyrogenic silica having a surface area of 200 m$^2$/g and 12.76 parts of a silicone oil containing hydroxyl groups and possessing 3.1 mol % of vinyl-methyl-siloxane units into 100 parts of a polydimethylsiloxane containing vinyl groups (0.003 mol % of vinyl-methyl groups).

This prremix is divided into six parts and each is mixed, on a rubber mixing mill, with a 50% strength bis-(2,4-dichlorobenzoyl)peroxide paste in silicone oil, and, optionally, with a polycarbodiimide-polysiloxane copolymer according to Example 1 or dicyclohexylcarbodiimide, in accordance with Table 1 below.

Sheets of 2 and 6 mm thickness of these six mixtures are vulanized in a heated press at 120° C. The vulcanization time is 10 minutes. The test specimens according to the abovementioned standard specifications are cut from these sheets. Post-vulcanization in hot air is dispensed with, so that the concentration of crosslinking agent decomposition products in the vulcanized materials should be preserved. This is done in order deliberately to create more severe ageing conditions.

The test specimens are examined in accordance with the abovementioned DIN or ASTM instructions. Some of the samples are aged, after vulcanization, for 70 or 120 hours at 200° C. in sealed glass tubes, and are then tested in accordance with the abovementioned DIN instructions. The progress of hydrolytic ageing is followed by measuring the strengths.

TABLE 1

|  | Example 3 | Example 4 | Example 5 | Example 6 | Example 7 | Example 8 |
|---|---|---|---|---|---|---|
| Premix | 100.0 | 100.0 | 100.0 | 100.0 | 100.0 | 100.0 |
| Polycarbodiimide-siloxane copolymer | — | 1.0 | 2.0 | 3.0 | 4.0 | — |
| Dicyclohexylcarbodiimide | — | — | — | — | — | 1.0 |
| Bis-(2,4-dichlorobenzoyl) peroxide paste | 1.2 | 1.5 | 1.9 | 2.2 | 2.5 | 1.5 |
| 10'/120° C. press temperature |  |  |  |  |  |  |
| Strength (MPA) | 9.1 | 9.7 | 9.1 | 9.3 | 9.0 | 5.7 |
| Elongation (%) | 605 | 590 | 535 | 535 | 535 | 620 |
| Modulus (100%) | 1.5 | 1.5 | 1.5 | 1.5 | 1.5 | 1.1 |
| Modulus (300%) | 3.9 | 4.4 | 4.5 | 4.6 | 4.4 | 2.4 |
| Hardness (Shore A) | 60 | 60 | 61 | 57 | 59 | 52 |
| Elasticity (%) | 20 | 24 | 22 | 22 | 23 | 16 |
| Crescent (N/mm) | 33.2 | 31.0 | 29.6 | 30.5 | 27.1 | 35.0 |
| 10'/120° C. press temperature + 70 hr test-tube ageing at 200° C. |  |  |  |  |  |  |
| Strength (MPA) | 0.5 | 0.6 | 1.3 | 1.7 | 2.1 | 0.3 |
| Elongation (%) | — | 20 | 90 | 190 | 220 | — |
| Modulus (100%) | — | — | — | 1.5 | 1.5 | — |
| 10'/120° C. press temperature + 120 hr test-tube ageing at 200° C. |  |  |  |  |  |  |
| Strength | 0.3 | 0.2 | 0.6 | 1.2 | 1.4 | — |
| Elongation | — | — | — | 65 | 80 | — |

EXAMPLES 9 TO 11

100 parts of a polydimethylsiloxane containing vinyl groups, 1 part of hexamethyldisilazane, 58.0 parts of a pyrogenic silica having a surface area of 200 m²/g, 12.8 parts of a polydimethylsiloxane oil containing hydroxyl groups, 2 parts of a 50% strength paste of black iron oxide pigment in polydimethylsiloxane containing vinyl groups, and 0.8 part of bis-tert.-butyl-(peroxydiisopropyl)-benzene are mixed on a mill, in one and the same pass, with the amounts, shown in Table 2, of polycarbodiimide-polysiloxane polymer according to Example 1 and of a 50% strength bis-(2,4-dichlorobenzoyl)-peroxide paste.

2 and 6 mm thick sheets of these mixtures are vulcanized for 10 minutes in a heated press at 120° to 180° C., using rapid heating. The test specimens are cut from these sheets in accordance with standard specifications and are tested appropriately. Some of the samples, after having been vulcanized, are heated for 10 days at 200° C. by means of hot air and others for 3 days at 225° C. Yet a further number of the samples are heated for 70 hours in a sealed glass tube at 200° C.

Following their vulcanization with or without subsequent heat ageing, all the samples are tested in accordance with the DIN instructions. The progress of the hydrolytic ageing is followed by measuring the strengths.

TABLE 2

|  | Example 9 | Example 10 | Example 11 |
|---|---|---|---|
| Polydimethylsiloxane containing vinyl groups | 100.0 | 100.0 | 100.0 |
| Hexamethyldisilazane | 1.0 | 1.0 | 1.0 |
| Silica | 58.0 | 58.0 | 58.0 |
| Polydimethylsiloxane containing hydroxyl groups | 12.8 | 12.8 | 12.8 |
| Iron oxide pigment | 2.0 | 2.0 | 2.0 |
| Dicumyl peroxide | 0.8 | 0.8 | 0.8 |
| Polycarbodiimide-polysiloxane copolymer | 4.0 | 4.0 | 6.0 |
| Peroxide paste as per text | 1.4 | 1.8 | 1.4 |
| Vulcanization at 120-180° C., duration 10' |  |  |  |
| Strength (MPa) | 8.5 | 8.3 | 7.9 |
| Elongation (%) | 450 | 460 | 450 |
| Modulus (100%) | 2.0 | 2.1 | 1.9 |
| Modulus (300%) | 5.4 | 5.4 | 5.0 |
| Hardness (Shore A) | 63 | 64 | 63 |
| Elasticity (%) | 37 | 31 | 29 |
| Crescent (N/mm) | 18 | 21 | 21 |
| Vulcanization 120→ 180° C., 10' + 10 days at 200° C. in hot air |  |  |  |
| Strength | 5.2 | 5.4 | 5.0 |
| Elongation | 250 | 250 | 250 |
| Modulus (100%) | 3.1 | 3.2 | 3.1 |
| Hardness | 71 | 71 | 72 |
| Elasticity | 23 | 28 | 28 |
| Vulcanization 120→ 180° C., 10' + 3 days at 225° C. in hot air |  |  |  |
| Strength | 4.0 | 4.5 | 4.6 |
| Elongation | 200 | 240 | 235 |
| Modulus (100%) | 2.9 | 3.0 | 3.1 |
| Hardness | 69 | 73 | 72 |
| Elasticity | 22 | 24 | 24 |
| Vulcanization 120→ 180° C., 10' + 70 hrs at 200° C. in a sealed test-tube |  |  |  |
| Strength | 1.1 | 1.2 | 1.6 |
| Elongation | 40 | 60 | 70 |

EXAMPLES 12 TO 16

A silicone rubber premix is prepared in the usual manner on a rubber mixer by adding, to 100 parts of a polydimethylsiloxane containing vinyl groups, 27.5 parts of pyrogenically produced silica of surface area greater than 300 m²/g and 6.33 parts of a silanol-based processing auxiliary.

This premix is divided into four parts and mixed on a rubber mixer with polycarbodiimide-polysiloxane copolymer according to Example 2 and with a 50% strength bis-(2,4-dichlorobenzoyl)peroxide paste in silicone oil, in accordance with Table 3 below.

2 and 6 mm thick sheets of these mixtures are crosslinked in a heated press at 120° C., with a vulcanization time of 10 minutes. The test specimens cut from the sheets in accordance with the appropriate standard specifications are tested in accordance with the said specifications. Some of the samples, after having been vulcanized, are heated for 10 days at 200° C. by means of hot air and others for 3 days at 225° C. Yet a further number of the samples are heated for 70 hours in a sealed glass tube at 200° C. Following their vulcanization, with or without subsequent heat ageing, all the samples are tested in accordance with standard specification instructions. The progress of the hydrolytic degradation is followed by measuring the strengths.

TABLE 3

|  | Example 12 | Example 13 | Example 14 | Example 15 |
|---|---|---|---|---|
| Premix | 100.0 | 100.0 | 100.0 | 100.0 |
| Polycarbodiimide-polysiloxane copolymer | 8.0 | 6.0 | 4.0 | — |
| Peroxide paste as per text | 1.4 | 1.0 | 1.2 | 1.4 |
| Vulcanization for 10'/120° C. press temperature |  |  |  |  |
| Strength (mPa) | 7.7 | 7.0 | 7.9 | 8.7 |
| Elongation (%) | 555 | 590 | 545 | 490 |
| Modulus (100%) | 1.4 | 1.3 | 1.5 | 1.7 |
| Modulus (300%) | 0.7 | 3.1 | 4.0 | 4.7 |
| Hardness (Shore A) | 50 | 54 | 59 | 66 |
| Elasticity (%) | 19 | 18 | 20 | 25 |
| Crescent (N/mm) | 35 | 36 | 33 | 32 |
| Vulcanization for 10'/120° C. press temperature + 10 days at 200° C. in hot air |  |  |  |  |
| Strength | 5.2 | 4.7 | 4.7 | 5.1 |
| Elongation | 310 | 325 | 300 | 270 |
| Modulus (100%) | 2.3 | 2.2 | 2.4 | 2.9 |
| Modulus (200%) | 3.7 | 3.3 | 3.6 | 4.3 |
| Hardness | 70 | 71 | 73 | 76 |
| Elasticity | 23 | 23 | 25 | 28 |
| Vulcanization for 10'/120° C. press temperature + 3 days at 225° C. in hot air |  |  |  |  |
| Strength | 4.8 | 4.4 | 4.8 | 4.9 |
| Elongation | 360 | 335 | 310 | 245 |
| Modulus (100%) | 2.0 | 2.0 | 2.4 | 2.8 |
| Modulus (200%) | 3.0 | 2.9 | 3.6 | 4.2 |
| Hardness | 68 | 68 | 69 | 73 |
| Elasticity | 16 | 17 | 17 | 22 |
| Vulcanization for 10'/120° C. press temperature + 70 hours at 200° C. in a test-tube |  |  |  |  |
| Strength | 2.6 | 2.0 | 1.3 | — |
| Elongation | 330 | 260 | 105 | — |
| Modulus (100%) | 1.1 | 1.2 | 1.3 | — |
| Modulus (200%) | 1.6 | 1.6 | — | — |

EXAMPLE 17

This example illustrates preparation of another polycarbodiimide-polysiloxane copolymer.

For this preparation, 20 kg of a polydimethylsiloxane with terminal hydroxyl groups, having a viscosity of 18,000 mPas, are stirred by means of a stirring disc at 500 to 800 rpm, and warmed to 70° C. 30 g of a 1-methylphospholine oxide isomer mixture are added and 20 kg of an isomer mixture of 80 percent by weight of toluylene-2,4-diisocyanate and 20 percent by weight of toluylene-2,6-diisocyanate are metered into this mixture in a uniform stream over the course of 2 hours, with constant stirring. The carbon dioxide formed is led away. After completion of the addition of the isocyanate, stirring is continued for one hour at the same temperature, after which the product is cooled to room temperature.

The product is a white to pale yellowish, viscous composition having a viscosity of about 300,000 mPas. heated to 80° C. and 1.5 g of 1-methylphospholine oxide isomer mixture are added. 1,500 g of diphenylmethane-4,4'-diisocyanate, which has been warmed to 40° C., are metered in over the course of 2 hours at 80° C., with constant stirring by means of an anchor stirrer, and after completion of the addition stirring is continued for 1 hour at 80° C. A white, pourable composition having a viscosity of 330,000 mPas is obtained.

EXAMPLES 18 TO 21

A silicone rubber premix is prepared on a rubber mixing mill by mixing, in the usual manner, 27.5 parts of a pyrogenically produced silica having a surface area of at least 300 m$^2$/g and 6.33 parts of a silanol-based processing auxiliary into 100 parts of a polydimethylsiloxane containing vinyl groups (viscosity 4.5.10$^6$ mPas, methylvinylsiloxy content 0.175 mol%)

This premix is divided into 4 equal parts and each is mixed, on the rubber mixing mill, with diatomaceous earth and dicumyl peroxide and come with a polycarbodiimide-polysiloxane copolymer according to Example 17 in accordance with Table 1 below.

Sheets of 2 and 6 mm thickness of these four mixtures were vulcanized in a heated press at 170° C. The vulcanization time is 10 minutes. The test specimens according to DIN specification 53,517 are cut from these sheets.

Some of the samples are aged, after vulcanization, for 6 hours in hot air at 200° C. Thereafter, the permanent set is tested in accordance with the abovementioned DIN specification.

TABLE 4

|  | Example 18 | Example 19 | Example 20 | Example 21 |
|---|---|---|---|---|
| Premix | 100 | 100 | 100 | 100 |
| Diatomaceous earth | 60 | 60 | 60 | 60 |
| Dicumyl peroxide | 0.6 | 0.2 | 0.6 | 0.2 |
| Polycarbodiimide-polysiloxane copolymer | 2.0 | — | — | 2.0 |
| Permanent set (%) |  |  |  |  |
| 10'/170° C. in a press | 12.6 | 15.9 | 15.6 | 12.9 |
| 10'/170° C. in a press + 6 hours/200° C. in hot air | 11 | 10 | 11 | 8 |

EXAMPLES 22 TO 25

A silicone rubber premix is first prepared on a rubber mixing mill by mixing, in the usual manner, 100 parts of a polydimethylsiloxane containing methyl vinyl siloxy groups (0.125 Mol%, 4,5.10$^6$ mPas) 27.5 parts of a pyrogenically produced silica having a BET surface area of at least 300 m$^2$/g and 6.33 parts of an organosilanol-based processing auxiliary. This premix is divided into 4 equal parts and each of these is mixed in accordance with the numerical data in Table 2 below, with diatomaceous earth and a 50 percent strength paste of bis-(2,4-dichlorobenzoyl)peroxide in silicone oil, and in three instances with a polycarbodiimidepolysiloxane copolymer according to Example 17.

These 4 mixtures were used, on the one hand, to vulcanize sheets of 2 and 6 mm thickness for 10 minutes in a heated press at 120° C., some of the sheets then being treated in hot air at 200° C. for 6 hours; on the other hand, some sheets were not treated in a press and only exposed to hot air at 200° C. for 10 minutes. Following the vulcanization, the permanent set is determined in accordance with DIN specification 53,517.

TABLE 5

|  | Example 22 | Example 23 | Example 24 | Example 25 |
|---|---|---|---|---|
| Premix | 100 | 100 | 100 | 100 |
| Diatomaceous earth | 60 | 60 | 60 | 60 |
| Polycarbodiimide-polysiloxane copolymer | — | 1.0 | 1.5 | 2.0 |
| Bis-(2,4-dichlorobenzoyl) peroxide | 1.5 | 1.5 | 1.5 | 1.5 |
| Vulcanization for 10'/120° C. in a press Permanent set (%) | 99.2 | 83.2 | 70.4 | 60.0 |
| Vulcanization for 10'/120° C. in a press + 6 hours/200° C. in hot air Permanent set (%) | 86.2 | 56.8 | 33.6 | 22.8 |
| Vulcanization for 10'/200° C. in hot air Permanent set (%) | 99.0 | 59.0 | 58.1 | 45.3 |

EXAMPLES 26 AND 27

A silicone rubber premix as described in Examples 18 to 25 is first prepared on a rubber mixing mill. 60 parts of diatomaceous earth and 1.5 parts of a 50 percent strength paste of bis-(2,4-dichlorobenozyl)peroxide in silicone oil are added to 100 parts of this premix. The sample is divided and one half is left unmodified. 1 part of polycarbodiimide-polysiloxane copolymer of Example 17 is added to 100 parts of the other half, and mixed in.

2 and 6 mm sheets produced from a part of both samples are vulcanized in a heated press at 120° C. The vulcanization time is 10 minutes. Some of the vulcanized sheets are treated in hot air at 200° C. The duration of the hot air treatment is 6 hours.

2 and 6 mm thick sheets were also produced from another part of both samples, and these sheets were vulcanized by hot air at 200° C. over the course of 10 minutes. Thereafter, the permanent set is determined in accordance with DIN specification 53,517.

TABLE 6

| | Permanent set (%) after vulcanization | | |
|---|---|---|---|
| | 10'/120° C. | 10'/120° C. + 6 hours/200° C. in hot air | 10'/200° C. in hot air |
| Example 26 | 29.7 | 15.4 | 27.4 |
| Example 27 | 16.5 | 6.0 | 16.4 |

EXAMPLES 28 AND 29

A silicone rubber premix is prepared on a rubber mixing mill by mixing 100 parts of a polydimethylsiloxane containing vinyl groups, 1 part of hexamethyldisilazane, 58 parts of pyrogenically produced silica having a surface area of 200 m²/g and 12.76 parts of an organosilanol-based processing auxiliary. The premix is divided and the first half (Example 28) is mixed with 1.4 parts of bis-(2,4-dichlorobenzoyl)peroxide, and the second half (Example 29) with 1.4 parts of bis-(2,4-dichlorobenzoyl)peroxide and 6 parts of polycarbodiimide-polysiloxane copolymer according to Example 2.

Sheets of 2 and 6 mm thickness are prepared from both mixtures and are vulcanized over the course of 10 minutes at 120° C. The permanent set determinations according to DIN 53,517 are shown in Table 7.

TABLE 7

| Permanent set (%) after vulcanization (10'/120° C.) | |
|---|---|
| Example 28 | Example 29 |
| 81.9 | 57.1 |

It will be appreciated that the instant specification and examples are set forth by way of illustration and not limitation, and that various modifications and changes may be made without departing from the spirit and scope of the present invention.

We claim:

1. A composition which is heat curable to give an elastomer of improved properties comprising
   (a) an organopolysiloxane polymer having a viscosity of 1,000,000 to 200,000,000 mPas at 25° C. and comprising the structural unit

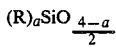

wherein
   R is a hydrocarbon radical or a halohydrocarbon radical, and
   a is between about 1.95 and 2.01,
   (b) a polycarbodiimide-polysiloxane copolymer comprising a polysiloxane continuous liquid phase containing a discontinuous phase of finely dispersed polycarbodiimide particles produced by condensing a diisocyanate in the polysiloxane,
   (c) a curing catalyst, and
   (d) a filler,
   the polycarbodiimide comprising about 0.1 to 80% by weight of (a) plus (b).

2. A composition according to claim 1, in which R is alkyl or haloalkyl with 1 to 8 carbon atoms, alkenyl with 2 to 8 carbon atoms, or a mononuclear aryl radical.

3. A composition according to claim 1, in which R is methyl, vinyl and/or phenyl.

4. A composition according to claim 1, in which by weight of (a) plus (b) the polycarbodiimide comprises about 0.1 to 12%.

5. A composition according to claim 1, in which by weight of (a) plus (b) the polycarbodiimide comprises about 0.5 to 3%.

6. A composition according to claim 1, in which by weight of (a) plus (b) the polycarbodiimide comprises about 1 to 20%.

7. A composition according to claim 1, in which by weight of (a) plus (b) the polycarbodiimide comprises about 6 to 20%.

8. In the production of an elastomer by heat curing a composition comprising an organopolysiloxane, a curing catalyst and a filler, the improvement which comprises incorporating in such composition a polycarbodiimide-polysiloxane copolymer comprising a polysiloxane continuous liquid phase containing a discontinuous phase of finely dispersed polycarbodiimide particles produced by condensing a diisocyanate in the polysiloxane, the polycarbodiimide comprising about 0.5 to 3% by weight of organopolysiloxane plus polycarbodiimide-polysiloxane copolymers, whereby the resistance to hydrolytic degradation is improved.

9. In the production of an elastomer by heat curing a composition comprising an organopolysiloxane, a curing catalyst and a filler, the improvement which comprises incorporating in such composition a polycarbodiimide-polysiloxane copolymer comprising a polysiloxane continuous liquid phase containing a discontinuous phase of finely dispersed polycarbodiimide particles produced by condensing a diisocyanate in the polysiloxane, the polycarbodiimide comprising about 6 to 20% by weight of organopolysiloxane plus polycarbodiimide-polysiloxane copolymer, whereby the permanent set of the elastomer is improved.

* * * * *